United States Patent
Schadow et al.

(10) Patent No.: US 10,932,113 B2
(45) Date of Patent: Feb. 23, 2021

(54) MOVEMENT-DEPENDENT TRANSMISSION OF DATA BETWEEN A HAND-HELD MACHINE TOOL AND AN EXTERNAL UNIT

(71) Applicant: Robert Bosch GmbH, Stuttgart (DE)

(72) Inventors: Joachim Schadow, Stuttgart (DE); Joern Stock, Leinfelden-Echterdingen (DE); Florian Esenwein, Leinfelden-Echterdingen (DE); Anna Heszler, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/310,440

(22) PCT Filed: Jun. 7, 2017

(86) PCT No.: PCT/EP2017/063812
§ 371 (c)(1),
(2) Date: Dec. 16, 2018

(87) PCT Pub. No.: WO2017/215999
PCT Pub. Date: Dec. 21, 2017

(65) Prior Publication Data
US 2019/0200201 A1    Jun. 27, 2019

(30) Foreign Application Priority Data

Jun. 16, 2016 (DE) ............ 10 2016 210 765.8

(51) Int. Cl.
*H04W 88/02*    (2009.01)
*H04W 4/029*    (2018.01)
(Continued)

(52) U.S. Cl.
CPC ............ *H04W 4/80* (2018.02); *B25F 5/00* (2013.01); *H04L 67/12* (2013.01); *H04W 76/14* (2018.02)

(58) Field of Classification Search
CPC ....... H04W 4/02; H04W 4/029; H04W 88/00; H04W 88/02; H04W 88/18; H04B 1/38; H04B 1/3827; H04B 1/3883
See application file for complete search history.

(56) References Cited

U.S. PATENT DOCUMENTS 7,336,181 B2 * 2/2008 Nowak ............ G06K 17/0022
340/572.1
7,928,845 B1 * 4/2011 LaRosa ............ G08B 13/1427
340/539.21
(Continued)

FOREIGN PATENT DOCUMENTS

CN    104363557 A    2/2015
CN    105359488 A    2/2016
(Continued)

OTHER PUBLICATIONS

International Search Report corresponding to PCT Application No. PCT/EP2017/063812, dated Aug. 24, 2017 (German and English language document) (7 pages).

*Primary Examiner* — Blane J Jackson
(74) *Attorney, Agent, or Firm* — Maginot, Moore & Beck LLP (57) ABSTRACT

A method for the wireless transmission of electronic data between a hand-held machine tool and an external unit includes automatically activating a communication unit for transmitting the electronic data as a function of a characteristic movement variable of the communication unit.

6 Claims, 3 Drawing Sheets

(51) Int. Cl.
*H04W 4/80* (2018.01)
*B25F 5/00* (2006.01)
*H04L 29/08* (2006.01)
*H04W 76/14* (2018.01)

(56) References Cited

U.S. PATENT DOCUMENTS

| | | | | |
|---|---|---|---|---|
| 8,514,058 | B2 * | 8/2013 | Cameron | B66F 9/0755 |
| | | | | 340/10.1 |
| 9,430,370 | B2 * | 8/2016 | Mergener | G06F 12/023 |
| 9,430,928 | B2 * | 8/2016 | Ikeda | G08B 21/18 |
| 9,466,198 | B2 * | 10/2016 | Burch | G08B 21/0213 |
| 9,467,862 | B2 * | 10/2016 | Zeiler | H04W 4/029 |
| 9,756,402 | B2 * | 9/2017 | Stampfl | B25B 21/00 |
| 10,270,642 | B2 * | 4/2019 | Zhang | H04L 27/362 |
| 2005/0000998 | A1 | 1/2005 | Grazioli et al. | |
| 2007/0188323 | A1 | 8/2007 | Sinclair et al. | |
| 2012/0317489 | A1 | 12/2012 | Kuulusa et al. | |
| 2014/0240125 | A1 * | 8/2014 | Burch | G08B 21/0213 |
| | | | | 340/539.13 |
| 2015/0024678 | A1 | 1/2015 | Chang et al. | |
| 2015/0097674 | A1 * | 4/2015 | Mondal | H04W 4/029 |
| | | | | 340/572.1 |
| 2015/0136829 | A1 | 5/2015 | Howes | |
| 2016/0105923 | A1 | 4/2016 | Chen et al. | |
| 2018/0286158 | A1 * | 10/2018 | Dackefjord | G07C 9/00103 |
| 2019/0027002 | A1 * | 1/2019 | Esenwein | B25F 5/00 |

FOREIGN PATENT DOCUMENTS

| | | |
|---|---|---|
| EP | 0989243 A2 | 3/2000 |
| JP | 2004-230548 A | 8/2004 |
| WO | 2009/106157 A1 | 9/2009 |

\* cited by examiner

MOVEMENT-DEPENDENT TRANSMISSION OF DATA BETWEEN A HAND-HELD MACHINE TOOL AND AN EXTERNAL UNIT

This application is a 35 U.S.C. § 371 National Stage Application of PCT/EP2017/063812, filed on Jun. 7, 2017, which claims the benefit of priority to Serial No. DE 10 2016 210 765.8, filed on Jun. 16, 2016 in Germany, the disclosures of which are incorporated herein by reference in their entirety.

BACKGROUND

Methods, such as for example a Bluetooth method or the like, for in particular wireless transmission of electronic data, in particular between a hand-held machine tool and an external unit, are already known. In the methods that are already known, a communication unit is actively able to be activated by an operator in order to enable a communication connection between two connection partners. In addition, in a Bluetooth method, in the course of a first connection setup, an operator is actively able to input a code in order to verify a connection for transmitting electronic data between two connection partners.

SUMMARY

The disclosure is based on a method, in particular on a hand-held machine tool method, for in particular wireless transmission of electronic data, in particular between a hand-held machine tool and an external unit.

It is proposed, in at least one method step, for a communication unit for transmitting the electronic data to be automatically activated depending on a movement characteristic variable of the communication unit. A "communication unit for transmitting the electronic data is automatically activated depending on a movement characteristic variable of the communication unit" should be understood to mean in particular that the communication unit is automatically transferred, in particular switched, depending on a movement characteristic variable of the communication unit, in particular in a manner decoupled from a manual activation brought about by an operator, such as for example by actuating an operator element or the like, at least from a standby mode into an active mode. Preferably, the communication unit is automatically activated depending on an acceleration value of the communication unit and/or depending on a change in a local and/or global position characteristic variable of the communication unit, in particular transferred, in particular switched, from a standby mode into an active mode. Preferably, the communication unit is automatically switched from a standby mode into an active communication mode as a result of a movement of the communication unit, in particular as a result of a movement in space, in particular independently of a manual activation as a result of an actuation of an operator element by an operator. Preferably, the method is performed upon an initial recording of a connection, in particular upon an initial pairing, of at least two connection partners. It is also conceivable, however, for the method alternatively or additionally always to be carried out upon recording of a connection between at least two connection partners, in particular independently of whether there was already a connection between at least two connection partners in the past. Preferably, in at least one method step, as a result of a connection being established between at least two connection partners, an electronic list is drawn up in which each connection partner is assigned unique identification, such as for example through storage of an IP address, of a MAC address or the like.

The method is preferably provided for wireless transmission of electronic data between a hand-held machine tool and an external unit. The term "wireless transmission" should be understood to mean in particular that electronic data are transferred via an advantageously bodiless information carrier, for example via sound waves, light waves and/or preferably radio waves, in particular in a manner decoupled from a physical connection between connection partners. The communication unit is preferably configured as a WLAN communication unit, as a Bluetooth communication unit, as a radio communication unit, as an RFID communication unit, as an NFC unit, as an infrared communication unit, as a mobile radio network communication unit, as a Zigbee communication unit or the like. As an alternative, it is also conceivable, however, for the communication unit to be provided for wired and/or for wireless transmission of electronic data to an external unit. Particularly preferably, the communication unit is provided for wireless transmission of electronic data to an external unit and for wired transmission of electronic data to one or more machine-internal electronic unit(s). Further refinements of the communication unit that appear expedient to a person skilled in the art are likewise conceivable.

The external unit may be configured as a smartphone, as a personal computer, as a laptop, as a netbook, as a tablet, as a company central computer, as a clock, as an electronic wristband, as an output unit, such as for example as a loudspeaker, as work clothing, as protective glasses, as a protective helmet or as another external unit that appears expedient to a person skilled in the art. In the case of a refinement as a smartphone, as a personal computer, as a laptop, as a netbook or as a tablet, an app for communication with the communication unit is preferably provided. It is also conceivable, however, for the external unit to be configured as an external transportable operator unit, as a fixedly installed operator unit at a workstation of an operator, as a synchronization unit, fixedly installed in a space, in a place of use and that is able to be controlled by a central system, such as for example by way of company inputs/safety requirements, as a body characteristic variable monitoring unit or as another centralized or decentralized operator unit, input station and/or centralized or decentralized terminal that appears expedient to a person skilled in the art.

By way of the refinement according to the disclosure, it is advantageously possible to provide a comfortable method for transmitting electronic data between at least two connection partners. In addition, a high level of operator comfort is advantageously able to be provided by way of the refinement according to the disclosure, since manual actuation of an operator element for activating the communication unit may be dispensed with. It is also advantageously able to be ensured that a connection between two connection partners, in particular between the hand-held machine tool and the external unit, is reliably established, in particular for the purpose of a data comparison, for operator monitoring, for recording working times or the like.

It is furthermore proposed, in at least one method step, to record movement characteristic variables, in particular movement characteristic variables of the communication unit. Preferably, movement characteristic variables are stored in a memory in the form of movement paths, acceleration values, global and/or stationary position characteristic variables or the like. Preferably, the stored movement characteristic variables are able to be utilized for the purpose of an evaluation, for a comparison, for a plausibility comparison or the like by an electronic unit, in particular able to be processed by an electronic unit of the hand-held machine tool and/or of the external unit. In particular, the stored movement characteristic variables are able to be processed by the electronic unit for the purpose of an evaluation with regard to a duration of use, a working time or other evaluation characteristic variables that appear expedient to a person skilled in the art. Preferably, the stored movement characteristic variables are able to be transmitted by way of the communication unit to an external unit, such as for example a cloud, a company central system, a smartphone or the like. By way of the refinement according to the disclosure, it is advantageously possible to record movement characteristic variables, in particular movement characteristic variables of the communication unit, which are able to be used for example for recording a location, generating a movement characteristic variable profile or the like.

It is furthermore proposed, in at least one method step, in particular following activation of the communication unit, depending on a time interval, in particular on a time interval in which movement characteristic variables takes recorded, for a connection request to be sent, in particular wirelessly, by way of the communication unit. If for example a movement characteristic variable of the communication unit is recorded within a time interval of more than 1 second, preferably of more than 2 seconds and particularly preferably of more than 10 seconds, a connection request is sent by way of the communication unit, in particular for the purpose of setting up a connection with at least one connection partner situated in the vicinity of the communication unit. By way of the refinement according to the disclosure, sending of connection requests as a result of minor shaking of the communication unit is advantageously largely able to be avoided. It is advantageously possible to provide an energy-efficient method that runs automatically.

It is furthermore suggested, in at least one method step, for a connection partner to be selected at least depending on at least one distance characteristic variable. The distance characteristic variable may be configured as a signal attenuation, as a distance or as another characteristic variable that appears expedient to a person skilled in the art. Preferably, a connection partner is selected depending on a distance characteristic variable that has a lowest value in comparison with values of other distance characteristic variables of other potential connection partners. By way of example, it is conceivable for a connection request to be sent to one connection partner out of several potential connection partners that has the shortest distance and/or the lowest signal attenuation in comparison with other potential connection partners in relation to the communication unit. By way of the refinement according to the disclosure, it is advantageously possible to reliably send a communication request to a nearest connection partner.

It is furthermore proposed, in at least one method step, for movement characteristic variable profiles to be compared, in particular following setup of a connection between at least two connection partners. A "movement characteristic variable profile" should be understood to mean in particular a profile of recorded movement characteristic variables over time. It is preferably able to be recognized, on the basis of a comparison of movement characteristic variable profiles, in particular following connection of at least two connection partners, whether a substantially synchronous movement of the at least two connection partners takes place, whether there is substantial matching with a position of the connection partner or the like. By way of the refinement according to the disclosure, checking of a correct assignment between connection partners may advantageously be made possible in a simple manner. A reliable assignment of connection partners may thus advantageously be achieved.

It is furthermore proposed, in at least one method step, for a communication connection to be maintained or for a communication connection to be disconnected depending on an evaluation of the comparison of the movement characteristic variable profiles. If for example it is detected, by way of the comparison of the movement characteristic variable profiles, that the movement characteristic variable profiles have significant deviations from one another, a connection between the connection partners may automatically be disconnected in order for example to send a new connection request, in particular to a connection partner whose movement characteristic variable profile at least largely matches a movement characteristic variable profile of the communication unit. By way of the refinement according to the disclosure, it is advantageously possible to automatically maintain or disconnect a connection between two connection partners depending on a common movement of the connection partners.

It is additionally proposed, in at least one method step, for a comparison of at least one time characteristic variable to take place. The time characteristic variable may be configured as a working time, as a time of day, as a usage time, as an operating time or the like that is automatically recorded and that is in particular stored together with movement characteristic variables. By way of example, it is conceivable for an operating time of the communication unit to be recorded starting from an activation of the communication unit and compared with an operating time of a connection partner or the like. By way of the refinement according to the disclosure, an assignment of connection partners depending on a time characteristic variable, in particular on a common operating time or usage time, may advantageously be made possible. Redundant time recording, which is able to be utilized for working time recording, may advantageously be made possible.

It is furthermore proposed, depending on a status of a communication connection between at least one connection partner and at least one other connection partner, to transmit electronic data to at least one additional connection partner. By way of example, in the case of a connection between a hand-held machine tool and an external unit, additional data may be transmitted from or to a company central system. Information in relation to tasks, working time, emission limits or the like may be transmitted to the hand-held machine tool and/or to the external unit and/or be evaluated by the company central system. By way of the refinement according to the disclosure, reliable updating of data and/or securing of data may advantageously be made possible. An evaluation of electronic data may advantageously be made possible, which data are transmitted between the connection partner and the other connection partner during a connection.

It is furthermore proposed, in at least one method step, for the communication unit to be deactivated at least depending on a time interval in which no movement characteristic variables are recorded. If for example no movement characteristic variable is recorded within a time interval of more than 1 second, preferably of more than 2 seconds and particularly preferably of more than 10 seconds, the communication unit is deactivated, in particular switched into a standby mode. By way of the refinement according to the disclosure, an energy-saving configuration is advantageously able to be produced.

In addition, a device, in particular a hand-held machine tool device, with at least one communication unit and with at least one activation unit is proposed, which device is designed to automatically activate the communication unit depending on at least one movement characteristic variable of the communication unit, in particular in accordance with a method according to the disclosure. "Designed" should be understood to mean in particular specifically programmed, configured and/or equipped. An object being provided for a specific function should be understood to mean in particular that the object performs and/or executes this specific function in at least one application state and/or operating state. The device may be integrated into a hand-held machine tool or be configured as an external unit that is able to be worn by an operator on the body, for example. By way of the refinement according to the disclosure, automatic communication between at least two connection partners, in particular between the hand-held machine tool and the external unit, is advantageously able to be achieved.

The method according to the disclosure and/or the device according to the disclosure are/is not intended to be restricted herein to the above-described application and embodiment. In particular, the method according to the disclosure and/or the device according to the disclosure for performing a function, described herein, may have one of a multiplicity, mentioned herein, of individual elements, components and units and a varying number of method steps. In addition, in the case of the ranges of values specified in this disclosure, values that lie within the cited limits should also be considered as being disclosed and as being able to be used as desired.

BRIEF DESCRIPTION OF THE DRAWINGS

Further advantages emerge from the following description of the drawing. The drawing shows one exemplary embodiment of the disclosure. The drawing, the description and the claims contain numerous features in combination. A person skilled in the art will expediently also consider the features individually and combine them to form further expedient combinations.

In the drawings.

DETAILED DESCRIPTION

Figure 1:
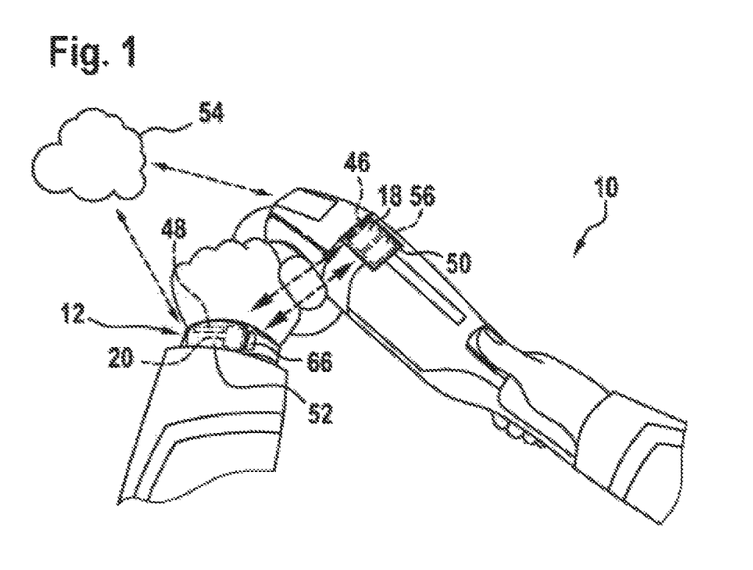
FIG. 1 shows a schematic depiction of a device according to the disclosure for transmitting electronic data.

FIG. 1 shows a hand-held machine tool 10 and an external unit 12 that communicate with one another in order to exchange electronic data, in particular communicate wirelessly with one another. The hand-held machine tool 10 is configured as an angle grinder in the exemplary embodiment shown in FIG. 1. It is also conceivable, however, for the hand-held machine tool 10 to have a different configuration that appears expedient to a person skilled in the art, such as for example a configuration as a drill, as a cordless screwdriver, as a circular saw, as a drill hammer, as a jigsaw, as a power planer or the like. The hand-held machine tool 10 has a configuration that is at least substantially known to a person skilled in the art. The hand-held machine tool 10 comprises at least one device 50 that has at least one communication unit 18 that is designed to transmit electronic data. The communication unit 18 of the hand-held machine tool 10 is configured as a wireless communication unit. It is also conceivable, however, for the communication unit 18 of the hand-held machine tool 10 alternatively or additionally to be configured as a wired communication unit. The device 50 of the hand-held machine tool 10 is configured as a hand-held machine tool device. The device 50 of the hand-held machine tool 10 is preferably integrated into the hand-held machine tool 10. It is also conceivable, however, for the device 50 of the hand-held machine tool 10 to be removably arrangeable on the hand-held machine tool 10. The device 50 of the hand-held machine tool 10 comprises at least the communication unit 18 of the hand-held machine tool 10 and at least one activation unit 46 that is designed to automatically activate the communication unit 18 of the hand-held machine tool 10 depending on at least one movement characteristic variable of the communication unit 18 of the hand-held machine tool 10.

The external unit 12 may be configured as a smartphone, as a personal computer, as a laptop, as a netbook, as a tablet, as a company central computer, as a clock, as an electronic wristband, as an output unit, such as for example as a loudspeaker, as work clothing, as protective glasses, as a protective helmet or as another external unit that appears expedient to a person skilled in the art. In the exemplary embodiment illustrated in FIG. 1, the external unit 12 is configured as an electronic wristband. The external unit 12 comprises at least one device 52 that has at least one communication unit 20 that is designed to transmit electronic data. The communication unit 20 of the external unit 12 is configured as a wireless communication unit. It is also conceivable, however, for the communication unit 20 of the external unit 12 alternatively or additionally to be configured as a wired communication unit. The device 52 of the external unit 12 comprises at least the communication unit 20 of the external unit 12 and at least one activation unit 48 that is designed to automatically activate the communication unit 20 of the external unit 12 depending on at least one movement characteristic variable of the communication unit 20 of the external unit 12.

The hand-held machine tool 10 and the external unit 12 are connected to one another in terms of data by way of the communication unit 18 of the hand-held machine tool 10 and of the communication unit 20 of the external unit 12 in order to transmit electronic data. The hand-held machine tool 10 and the external unit 12 are connection partners. The hand-held machine tool 10 may be connected in terms of data by way of the communication unit 18 of the hand-held machine tool 10 to an additional connection partner 54, such as for example a cloud, a company central system or the like, in order to exchange electronic data. The external unit 12 may be connected in terms of data by way of the communication unit 20 of the external unit 12 to the additional connection partner 54 in order to exchange electronic data.

Figure 2:
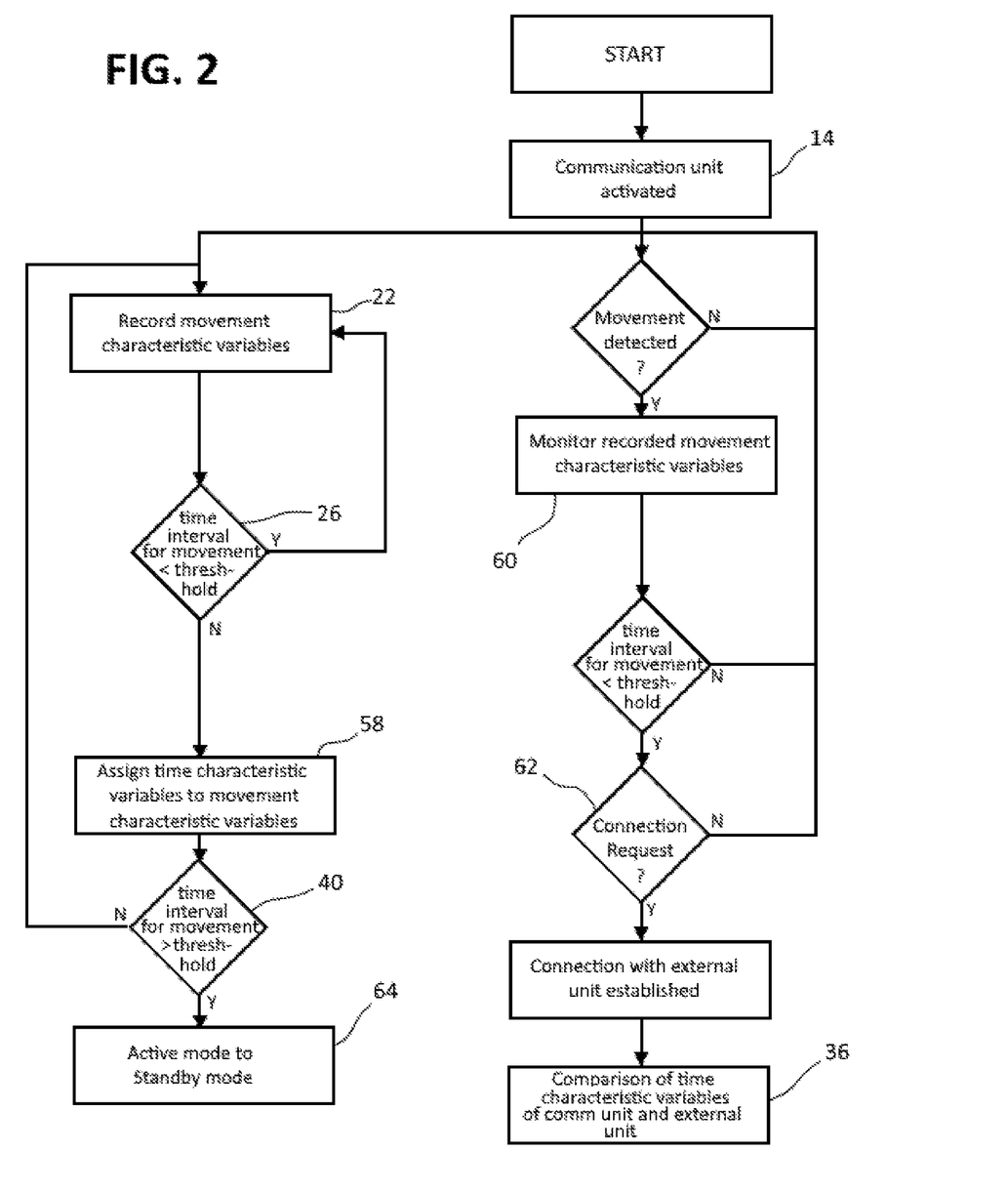
FIG. 2 shows a schematic depiction of a method sequence of a method according to the disclosure in the case of a hand-held machine tool.

FIG. 2 shows a method sequence of a method for transmitting electronic data between the hand-held machine tool 10 and the external unit 12 in the case of the hand-held machine tool 10. The method for in particular wireless transmission of electronic data between the hand-held machine tool 10 and the external unit 12 comprises at least one method step 14 in which the communication unit 18 of the hand-held machine tool 10 is automatically activated in order to transmit electronic data depending on a movement characteristic variable of the communication unit 18 of the hand-held machine tool 10. The hand-held machine tool 10 comprises in particular a movement sensor unit 56 that is designed to record at least movement characteristic variables of the communication unit 18 of the hand-held machine tool 10 (FIG. 1). The movement sensor unit 56 of the hand-held machine tool 10 is in particular designed to record an acceleration value of the communication unit 18 of the hand-held machine tool 10 and/or a local and/or global position characteristic variable of the communication unit 18 of the hand-held machine tool 10. The movement sensor unit 56 of the hand-held machine tool 10 is in particular connected in terms of data to the activation unit 46 of the device 50 of the hand-held machine tool 10. The communication unit 18 of the hand-held machine tool 10 is automatically activated, in at least one method step 14, depending on an acceleration value of the communication unit 18 of the hand-held machine tool 10 and/or depending on a change in a local and/or global position characteristic variable of the communication unit 18 of the hand-held machine tool 10, in particular transferred, in particular switched, from a standby mode into an active mode.

In at least one method step 22, movement characteristic variables of the communication unit 18 of the hand-held machine tool 10 are recorded. The device 50 of the hand-held machine tool 10 comprises a storage unit (not shown in more detail here), in which at least the movement characteristic variables of the communication unit 18 of the hand-held machine tool 10 are able to be stored. In at least one method step 26, in particular following activation of the communication unit 18 of the hand-held machine tool 10, presence of movement characteristic variables of the communication unit 18 of the hand-held machine tool 10 is checked depending on a time interval. If for example a movement characteristic variable of the communication unit 18 of the hand-held machine tool 10 is recorded within a time interval of more than 1 second, preferably of more than 2 seconds and particularly preferably of more than 10 seconds, the communication unit 18 of the hand-held machine tool 10 is left in active mode. If for example no movement characteristic variable of the communication unit 18 of the hand-held machine tool 10 is recorded within a time interval of more than 1 second, preferably of more than 2 seconds and particularly preferably of more than 10 seconds, the communication unit 18 of the hand-held machine tool 10 is transferred into standby mode. In at least one method step 58, time characteristic variables are assigned to the recorded movement characteristic variables of the communication unit of the hand-held machine tool 10 and stored. It may advantageously be documented when, to what extent and/or where the communication unit 18 of the hand-held machine tool 10 was moved. The recorded movement characteristic variables of the communication unit 18 of the hand-held machine tool 10 may be utilized in at least one method step 60 as monitoring parameters, in particular for monitoring presence of a movement.

In at least one method step 62, presence of a connection request, in particular of the communication unit 20 of the external unit 12, is checked. If no connection request is present and if no movement is recorded, in particular within a time interval of more than 1 second, the communication unit 18 of the hand-held machine tool 10 is transferred, in at least one method step 64, from an active mode into a standby mode.

Figure 3:
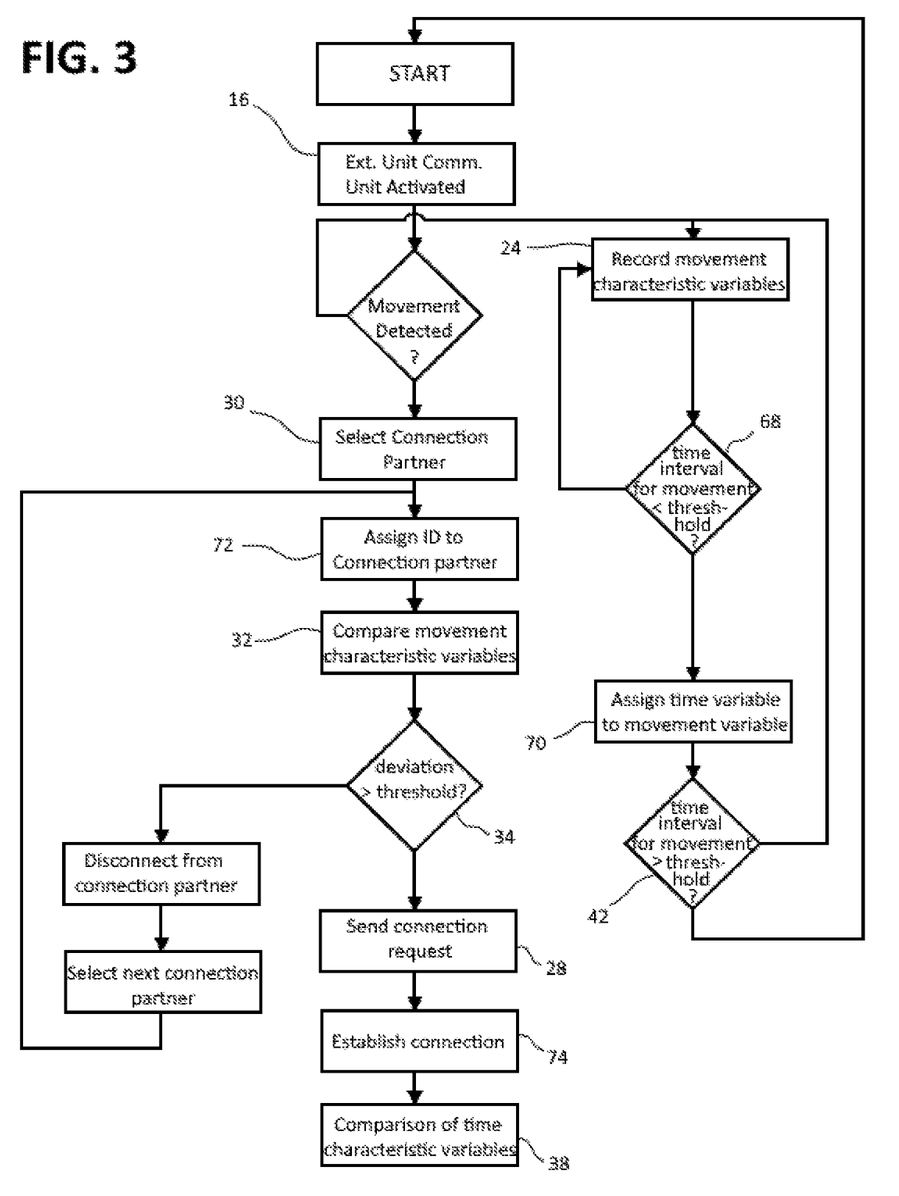
FIG. 3 shows a schematic depiction of a method sequence of the method according to the disclosure in the case of an external unit that communicates with the hand-held machine tool in order to exchange electronic data.

FIG. 3 shows a method sequence of a method for transmitting electronic data between the hand-held machine tool 10 and the external unit 12 in the case of the external unit 12. The method for in particular wireless transmission of electronic data between the hand-held machine tool 10 and the external unit 12 comprises at least one method step 16 in which the communication unit 20 of the external unit 12 is automatically activated in order to transmit the electronic data depending on a movement characteristic variable of the communication unit 20 of the external unit 12. The external unit 12 comprises in particular a movement sensor unit 66 that is designed to record at least movement characteristic variables of the communication unit 20 of the external unit 12 (FIG. 1).

The movement sensor unit 66 of the external unit 12 is in particular designed to record an acceleration value of the communication unit 20 of the external unit 12 and/or a local and/or global position characteristic variable of the communication unit 20 of the external unit 12. The movement sensor unit 66 of the external unit 12 is in particular connected in terms of data to the activation unit 48 of the device 52 of the external unit 12. The communication unit 20 of the external unit 12, in at least one method step 14, is automatically activated depending on an acceleration value of the communication unit 20 of the external unit 12 and/or depending on a change in a local and/or global position characteristic variable of the communication unit 20 of the external unit 12, in particular transferred, in particular switched, from a standby mode into an active mode.

In at least one method step 24, movement characteristic variables of the communication unit 20 of the external unit 12 are recorded. The device 52 of the external unit 12 comprises a storage unit (not shown in more detail here), in which at least the movement characteristic variables of the communication unit 20 of the external unit 12 are able to be stored.

In at least one method step 68, in particular following activation of the communication unit 18 of the hand-held machine tool 10, presence of movement characteristic variables of the communication unit 20 of the external unit 12 is checked depending on a time interval. If for example a movement characteristic variable of the communication unit 20 of the external unit 12 is recorded within a time interval of more than 1 second, preferably of more than 2 seconds and particularly preferably of more than 10 seconds, the of the communication unit 20 of the external unit 12 is left in active mode. If for example no movement characteristic variable of the communication unit 20 of the external unit 12 is recorded within a time interval of more than 1 second, preferably of more than 2 seconds and particularly preferably of more than 10 seconds, the communication unit 20 of the external unit 12 is transferred into standby mode. In at least one method step 70, time characteristic variables are assigned to the recorded movement characteristic variables of the communication unit 20 of the external unit 12 and stored. It may advantageously be documented when, to what extent and/or where the communication unit 20 of the external unit 12 was moved. In at least one method step 28, in particular following activation of the communication unit 20 of the external unit 12, a connection request is sent, in particular wirelessly, in particular automatically, by way of the communication unit 20 of the external unit 12, in particular to the communication unit 18 of the hand-held machine tool 10, depending on a time interval, in particular on a time interval in which movement characteristic variables are recorded.

In at least one method step 30, a connection partner, in particular of the hand-held machine tool 10, is selected at least depending on at least one distance characteristic variable. Preferably, the connection partner with the shortest distance and/or with the lowest signal attenuation in relation to the communication unit 20 of the external unit 12 is selected. In at least one method step 72, the connection partner is assigned an identification, such as for example n+1, that is in particular stored in the storage unit of the device 52 of the external unit 12. There may advantageously be a unique assignment in the case of a renewed connection setup.

In at least one method step 32, there is a comparison of movement characteristic variable profiles, in particular a comparison of a movement characteristic variable profile of the communication unit 18 of the hand-held machine tool 10 with a movement characteristic variable profile of the communication unit 20 of the external unit 12. In at least one method step 34, depending on an evaluation of the comparison of the movement characteristic variable profiles, a communication connection is maintained or a communication connection is disconnected. If it is detected for example by way of the comparison of the movement characteristic variable profiles that the movement characteristic variable profiles have significant deviations from one another, a connection between the connection partners may be automatically disconnected in order for example to send a new connection request to another potential connection partner. If it is detected, on the basis of the comparison of the movement characteristic variable profiles, that there is a large overlap between the movement characteristic variable profiles, in at least one method step 74, a connection request, in particular a pairing request, to the connection partner, in particular to the communication unit 18 of the hand-held machine tool 10, and in particular a connection between the connection partners, in particular the hand-held machine tool 10 and the external unit 12, is set up.

In at least one method step 36, 38, there is a comparison of at least one time characteristic variable. The time characteristic variable may be configured as a working time, as a time of day, as a usage time, as an operating time or the like, which is automatically recorded and that is stored in particular together with movement characteristic variables. It is conceivable for example for an operating time of the communication unit 18 of the hand-held machine tool 10 to be recorded starting from an activation of the communication unit 18 of the hand-held machine tool 10 and compared with an operating time of the communication unit 20 of the external unit 12 or the like. If a time characteristic variable, in particular a usage time, an operating time or the like, is exceeded, there is an output to an operator or to a company central system. It is also conceivable, depending on an exceedance of a limit value of a time characteristic variable, of an operator-specific characteristic variable, of an environment characteristic variable or the like, for an operator command to be able to be sent to the hand-held machine tool 10 by way of the external unit 12, which operator command interrupts operation, reduces power, activates an additional function (protective function and/or comfort function) or the like. In particular, depending on a status of a communication connection between at least one connection partner, in particular the hand-held machine tool 10, and at least one other connection partner, in particular the external unit 12, electronic data are transmitted to at least one additional connection partner, in particular the company central system.

In at least one method step 40, 42, the communication unit 18 of the hand-held machine tool 10 and/or the communication unit 20 of the external unit 12 are deactivated at least depending on a time interval in which there is no recording of movement characteristic variables. If for example no movement characteristic variable is recorded within a time interval of more than 1 second, preferably of more than 2 seconds and particularly preferably of more than 10 seconds, the communication unit of the hand-held machine tool 10 and/or the communication unit 20 of the external unit 12 is deactivated, in particular switched into a standby mode.

It is conceivable for the method to have alternative or additional method steps that a person skilled in the art considers to be expedient for performing the method, such as for example at least one method step in which connection partners having deviating movement characteristic variable profiles acquire a digital marker and/or such as for example at least one method step in which, depending on a number of comparisons performed that did not lead to a match of movement characteristic variable profiles, a connection is automatically deactivated or disconnected or the like.

The invention claimed is:

1. A method for the wireless transmission of electronic data between a communication unit of a hand-held machine tool designed as a first connection partner and a communication unit of an external unit designed as a second connection partner, the method comprising:
   automatically activating the communication unit of the hand-held machine tool so as to transmit the electronic data depending on an acceleration value and/or a change in a position parameter of the communication unit of the hand-held machine tool,
   automatically activating the communication unit of the external unit so as to transmit the electronic data depending on an acceleration value and/or a change in a position parameter of the communication unit of the external unit,
   if there are a plurality of potential connection partners for the communication unit of the hand-held machine tool, choosing the second connection partner from the potential connection partners depending on the signal attenuation and/or the distance between a respective potential connection partner and the communication unit of the hand-held machine tool,
   establishing a connection between the communication unit of the first connection partner and the communication unit of the second connection partner,
   comparing a motion parameter profile of the communication unit of the first connection partner with a motion parameter profile of the communication unit of the second connection partner, and
   maintaining or disconnecting the connection between the first connection partner and the second connection partner based on the comparison.

2. The method according to claim 1, wherein the acceleration value and/or the change in the local and/or global position parameter are/is recorded.

3. The method according to claim 1, wherein a connection request is transmitted by way of the communication unit following activation of at least one of the communication units depending on a time interval in which the acceleration value and/or the change in the local and/or global position parameter are/is recorded.

4. The method according to claim 1, wherein a respective time parameter of the connection partners is compared in at least one method step.

5. The method according to claim 1, wherein the electronic data is transmitted to at least one additional connection partner depending on a status of the communication connection between the connection partners.

6. The method according to claim 1, wherein the communication units are deactivated depending on a time interval in which the acceleration values and/or change in the local and/or global position parameters of the connection partners are/is not recorded.

\* \* \* \* \*